United States Patent
Bray et al.

(10) Patent No.: US 8,676,184 B2
(45) Date of Patent: Mar. 18, 2014

(54) METHOD FOR REMOTELY CONTROLLING A DEVICE BY MEANS OF A FIXED TRANSCEIVER STATION, DEVICE, USE OF A FIXED TRANSCEIVER STATION AND PROGRAM

(75) Inventors: Jeremy Bray, Herts (GB); Harald Schmitt, Bendorf (DE)

(73) Assignees: Deutsche Telekom AG, Bonn (DE); Deutsche Telekom (UK) Limited, Hertfordshire (GB)

( * ) Notice: Subject to any disclaimer, the term of this patent is extended or adjusted under 35 U.S.C. 154(b) by 0 days.

(21) Appl. No.: 13/576,683

(22) PCT Filed: Jan. 31, 2011

(86) PCT No.: PCT/EP2011/000428
§ 371 (c)(1),
(2), (4) Date: Aug. 2, 2012

(87) PCT Pub. No.: WO2011/095312
PCT Pub. Date: Aug. 11, 2011

(65) Prior Publication Data
US 2012/0315888 A1  Dec. 13, 2012

Related U.S. Application Data

(60) Provisional application No. 61/301,834, filed on Feb. 5, 2010.

(30) Foreign Application Priority Data

Feb. 5, 2010 (EP) ..................................... 10001206

(51) Int. Cl.
*H04M 3/00* (2006.01)

(52) U.S. Cl.
USPC ........... 455/420; 455/434; 455/511; 455/516; 455/68; 455/343.3

(58) Field of Classification Search
USPC ................... 455/420, 434, 511, 68, 70, 343.3
See application file for complete search history.

(56) References Cited

U.S. PATENT DOCUMENTS

| | | | | |
|---|---|---|---|---|
| 6,141,533 | A * | 10/2000 | Wilson et al. | 455/11.1 |
| 2002/0002034 | A1 | 1/2002 | Davies et al. | |
| 2009/0094648 | A1 | 4/2009 | Patel et al. | |
| 2011/0007673 | A1 * | 1/2011 | Ahn et al. | 370/280 |

OTHER PUBLICATIONS

Universal Mobile Telecommunications System (UMTS), Radio Resource Control (RRC); Protocol specification (3GPP TS 25.331 version 8.2 0 Release 8); ETSI TS 125 331, May 2008, paragraphs [8 1.1], [8.1.1.1.2], [8.1.1.6.2], [8.6.2.1], [10.2.48.8.5], Table 8.1.1.

* cited by examiner

*Primary Examiner* — Manpreet Matharu
(74) *Attorney, Agent, or Firm* — Leydig, Voit & Mayer, Ltd.

(57) ABSTRACT

A method for remotely controlling a device by a fixed transceiver station in a radio cell of a cellular mobile telecommunications network, the cellular mobile telecommunications network being at least one of a Long Term Evolution (LTE) network or a Universal Mobile Telecommunications System (UMTS) Terrestrial Radio Access Network (UTRAN), includes: transmitting to the device on a control channel, by the fixed transceiver station, control information specific to the radio cell; wherein the control channel is a channel or a portion of a channel used to broadcast location information; wherein the control information comprises an identification part for specifying the device; and wherein the device is not required to have a registration with the network.

13 Claims, 1 Drawing Sheet

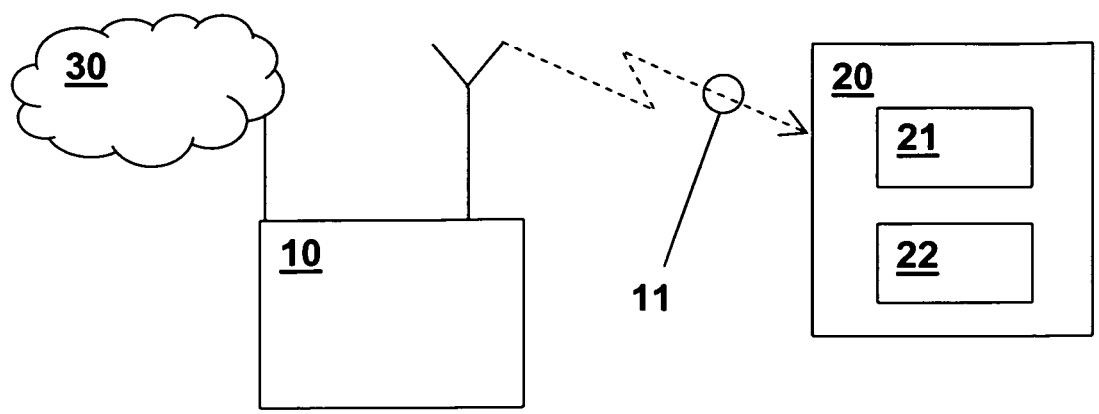

METHOD FOR REMOTELY CONTROLLING A DEVICE BY MEANS OF A FIXED TRANSCEIVER STATION, DEVICE, USE OF A FIXED TRANSCEIVER STATION AND PROGRAM

CROSS-REFERENCE TO RELATED APPLICATIONS

This patent application is a national stage entry under 35 U.S.C. §371 of International Application No. PCT/EP2011/000428, filed Jan. 31, 2011, and claims priority to European Patent Application No. EP 10001206.1, filed Feb. 5, 2010, and U.S. Provisional Patent Application No. 61/301,834, filed Feb. 5, 2010. The International Application was published in English on Aug. 11, 2011 as WO 2011/095312.

FIELD

The present invention relates to a method for remotely controlling a device by means of a fixed transceiver station in a radio cell of a cellular mobile telecommunications network of the type of either a Long Term Evolution (LTE) or a Universal Mobile Telecommunications System (UMTS) Terrestrial Radio Access Network (UTRAN).

BACKGROUND

In LTE and UMTS it is not possible to remotely control individual, groups or any number of machine devices without the use of dedicated control messages. This means that
any machine device has to implement a full Radio Resource Control (RRC) stack,
any machine device has to implement a transceiver, and
there is no mechanism for the operator of the mobile telecommunications network to remotely control any device without first establishing an Radio Resource Control (RRC) connection between the device and the network.
Therefore, a machine device that has not implemented the Radio Resource Control (RRC) stack cannot be remotely controlled by the operator of the mobile telecommunications network. Furthermore, a machine device without a transceiver cannot be remotely controlled by the operator of the mobile telecommunications network.

This is a limitation for an operator of the mobile telecommunications network as it means that some devices cannot be remotely controlled at all; and other devices can only be controlled with a Radio Resource Control (RRC) connection, which requires that the device registers with the network and uses dedicated network resources.

SUMMARY

In an embodiment, the present invention provides a method for remotely controlling a device by a fixed transceiver station in a radio cell of a cellular mobile telecommunications network. The cellular mobile telecommunications network is at least one of a Long Term Evolution (LTE) network or a Universal Mobile Telecommunications System (UMTS) Terrestrial Radio Access Network (UTRAN). The method includes: emitting on a control channel, by the fixed transceiver station, control information specific to the radio cell; wherein the control channel is a channel or a portion of a channel used to broadcast location information; wherein the control information comprises an identification part for specifying the device; and wherein the device is not required to have a registration with the network.

BRIEF DESCRIPTION OF THE DRAWINGS

FIG. 1 illustrates schematically an example of a fixed transceiver station controlling a device according to the present invention.

DETAILED DESCRIPTION

In an embodiment, the present invention provides a method for remotely controlling a device by means of a fixed transceiver station in a radio cell of a cellular mobile telecommunications network of the type of either a Long Term Evolution (LTE) or a Universal Mobile Telecommunications System (UMTS) Terrestrial Radio Access Network (UTRAN). In another embodiment, the present invention provides a device to be remotely controlled and the use of a fixed transceiver station to remotely control such a device.

In another embodiment, the present invention provides a method for remotely controlling a device by means of a fixed transceiver station in a radio cell of a cellular mobile telecommunications network of the type of either a Long Term Evolution (LTE) or a Universal Mobile Telecommunications System (UMTS) Terrestrial Radio Access Network (UTRAN), wherein the device lacks a registration with the network, the method comprising the fixed transceiver station emitting a control information on a control channel, the control information being an information specific to the radio cell and the control channel being a channel or portion of a channel used to broadcast a location information, wherein the control information comprises an identification part serving to specify the device.

It is thereby advantageously possible to enable the deployment of cheap machine devices that can be remotely controlled by operators of the mobile telecommunications networks. A cheap machine device can be realized without the need for a transceiver, and by implementing only a very limited Radio Resource Control (RRC) stack. Furthermore, since such cheap machine devices do not register with the network this saves network resources, e.g. regarding Subscriber Identity Module (SIM), Home Location Register (HLR) or the like.

According to the present invention, it is therefore preferred that the device lacks a Radio Resource Control connection with the network. By the term "lacks a Radio Resource Control (RRC) connection with the network" is meant that either no Radio Resource Control is realized at all or that only a limited Radio Resource Control (RRC) stack is present in (or with) the (machine) device of the present invention and used according to the inventive method.

According to the present invention, it is possible for an operator of the mobile telecommunications network to build and deploy cheap machine devices in its Long Term Evolution (LTE) and/or Universal Mobile Telecommunications System (UMTS) network without losing the possibility to remotely control and configure them. In an embodiment, such devices can read the system information broadcast messages (System Information Blocks (SIBs)) sent by the fixed transceiver station (e.g. a NodeB or other base station) on the broadcast common control channel.

According to the present invention, it is preferred that the control channel is a System Information Block (SIB) channel, preferably a System Information Block (SIB) type 2 channel.

Furthermore, it is preferred that the control information comprises at least one UMTS Registration Area (URA) identity.

System Information Block (SIB) type 2 contains the UMTS Registration Area (URA) identity list. According to 3GPP the UMTS Registration Area (URA) identity (or URA ID) range is from 1 to 65536 ($2^{16}$). According to the present invention, a set of reserved UMTS Registration Area (URA) identities is defined that will not be used in normal network planning.

According to the present invention, each remote device reads the System Information Block (SIB) type 2 control channel as per the 3GPP specifications. If a device detects any reserved UMTS Registration Area (URA) identities in the UMTS Registration Area (URA) identity list received, it then interprets this as a code and takes corresponding action, e.g. enable/disable, change frequency, or any other action. The code can be transmitted as a particular combination of reserved UMTS Registration Area (URA) identities in the UMTS Registration Area (URA) identity list, or as a sequence of combinations of reserved UMTS Registration Area (URA) identities in the UMTS Registration Area (URA) identity list over a period of time.

According to the present invention, it is therefore furthermore preferred that,
the control information comprises a command part serving to define the remote controlled behavior of the device, and/or
that the identification part of the control information specifies one device or a plurality of devices,
wherein preferably the identification part and/or the command part are formed by one UMTS Registration Area (URA) identity or by a plurality of UMTS Registration Area (URA) identities.

This means that the control information preferably comprises the identification part as well as the command part. Furthermore, this means that both the identification part and the command part can be provided in the form of one UMTS Registration Area (URA) identity or in the form of a plurality of UMTS Registration Area (URA) identities.

It is possible and preferred according to the present invention that one UMTS Registration Area (URA) (comprising, e.g., 16 bits) is used both for providing the identification part (or parts of the identification part) and the command part (or parts of the command part). For example, it is possible according to different alternatives of the present invention that in one single URA, the identification part and the command part is conveyed, e.g.
14 bits (of one single URA) are used to address the device (or group of devices) to be remote controlled (i.e. constitute the identification part), and 2 bits are used as the command part, i.e. indicate which action should be performed by the device);
15 bits (of one single URA) are used to address the device (or group of devices) to be remote controlled (i.e. constitute the identification part), and 1 bit is used as the command part, i.e. indicate which action should be performed by the device).

According to an alternative embodiment of the present invention, it is possible that two URAs are used to convey the identification part and the command part, e.g.
the 16 bits (of one of the two URAs) are used to address the device (or group of devices) to be remote controlled (i.e. constitute the identification part), and the 16 bits (of the other of the two URAs) are used as the command part, i.e. indicate which action should be performed by the device);

24 bits (of the two URAs, i.e. one URA and 8 bits of the other URA) are used to address the device (or group of devices) to be remote controlled (i.e. these bits constitute the identification part), and 8 bits are used as the command part, i.e. indicate which action should be performed).

An implementation of the present invention in an Long Term Evolution (LTE) network would rely on the use of another kind of control channel and on another kind of control information, e.g. the use of System Information Block (SIB) type 9 as the control channel and the use of the HNB-Name (Home NodeB Name) as the control information.

Another object of the present invention is a device to be remotely controlled by means of a fixed transceiver station in a radio cell of a cellular mobile telecommunications network of the type either a Long Term Evolution (LTE) or a Universal Mobile Telecommunications System (UMTS) Terrestrial Radio Access Network (UTRAN), the device comprising a receiver means capable of receiving a control information on a control channel of the fixed transceiver station, the control information being an information specific to the radio cell and the control channel being a channel or portion of a channel used to broadcast a location information, wherein the control information comprises an identification part serving to specify the device, wherein the device further comprises a control means able to decode the control information, and wherein the device lacks a registration with the network, and preferably also lacks a Radio Resource Control connection with the network.

It is advantageously possible to use the UMTS Registration Area (URA) identities for remote controlling the device.

Such devices according to the present invention are preferably simple devices that do not necessary need a complete Radio Resource Control (RRC) stack. Examples of such simple devices could be, e.g., repeaters used within a radio cell of the mobile telecommunications network to enhance the radio coverage in certain areas of the cell, e.g. in buildings or the like.

In another embodiment, the present invention provides the use of a fixed transceiver station to remotely control a device in a radio cell of a cellular mobile telecommunications network of the type of either a Long Term Evolution (LTE) or a Universal Mobile Telecommunications System (UMTS) Terrestrial Radio Access Network (UTRAN), wherein the device lacks a registration with the network, and preferably also lacks a Radio Resource Control connection with the network, wherein the fixed transceiver station emits a control information on a control channel, the control information being an information specific to the radio cell and the control channel being a channel or portion of a channel used to broadcast a location information, wherein the control information comprises an identification part serving to specify the device.

In another embodiment, the present invention provides a Program comprising a computer readable program code for controlling a fixed transceiver station to perform a method according to the present invention.

Another embodiment of the present invention provides a computer program product comprising a program controlling a fixed transceiver station as mentioned above.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, an example of a fixed transceiver station 10 controlling a device 20 according to the present invention is schematically represented.

The fixed transceiver station 10 is connected or part of a mobile telecommunications network 30. The telecommunications network 30 according to the present invention is an Long Term Evolution (LTE) network or a UMTS Terrestrial Radio Access Network (UTRAN).

The fixed transceiver station 10 emits a control information 11 on a control channel. The control information 11 is an information specific to the radio cell of the fixed transceiver station 10. The control channel is a channel or a portion of a channel used to broadcast a location information, especially a UMTS Registration Area (URA) identity information. Preferably, the control channel is a System Information Block (SIB) channel, and more preferably a System Information Block (SIB) type 2 channel.

The control information 11 is preferably a UMTS Registration Area (URA) identity or a plurality of UMTS Registration Area (URA) identities. According to 3GPP, the range of UMTS Registration Area (URA) identities is from 1 to 65536 ($2^{16}$) and the UMTS Registration Area (URA) identity list can contain up to 8 UMTS Registration Area (URA) identities. According to the present invention this is used to remote control the device 20. The device 20 is preferably a device that does not have a complete Radio Resource Control (RRC) stack. The range of possible values of UMTS Registration Area (URA) identities used for cell identification inside the telecommunications network is reduces such that a certain number of UMTS Registration Area (URA) identities can be used to remotely control the device 20. This means that a set of reserved UMTS Registration Area (URA) identities is created to be used for remote controlling the device 20. In case that the device 20 receives a UMTS Registration Area (URA) identity of the reserved set of UMTS Registration Area (URA) identities, such a UMTS Registration Area (URA) identity is not interpreted as a cell specific identification information but as a coded remote control command or part thereof The device 20 comprises a receiver means 21 capable of receiving the control information 11 from the fixed transceiver station 10. Furthermore, the device 20 comprises a control means 22 that is able to decode the control information 11. This means that due to the control means 22, the control information can be interpreted as a command received from the fixed transceiver station 10.

Possible actions to be performed by the device 20 due to the reception of the control information 11 include:
the device 20 being enabled;
the device 20 being disabled;
the device 20 changing its frequency;
the device 20 providing any feedback or acknowledgement signal, e.g. to a user.

According to an embodiment of the present invention, the control information 11 is sent repeatedly in an unchanged manner (e.g. every time the System Information Block (SIB) type 2 is broadcast) representing the same remote control command. Of course the control information 11 has to be changed in case the remote control command is changed.

According to another embodiment of the present invention, the control information 11 corresponding to a remote control command comprises the broadcasting of the System Information Block (SIB) type 2 at different times, e.g. according to a specific sequence.

It is possible according to the present invention, that the control information 11 comprises an identification part and a command part. The identification part serves to individually specify a device 20 out of a certain number of such devices also within the radio coverage area of the fixed transceiver station 10. For example, the identification part of the control information can comprise the (unique) serial number of the device 20 to be addressed.

The invention claimed is:

1. A method for remotely controlling a device by a fixed transceiver station in a radio cell of a cellular mobile telecommunications network, wherein the cellular mobile telecommunications network is at least one of a Long Term Evolution (LTE) network or a Universal Mobile Telecommunications System (UMTS) Terrestrial Radio Access Network (UTRAN), the method comprising:
transmitting to the device on a control channel, by the fixed transceiver station, control information specific to the radio cell;
wherein the control channel is a channel or a portion of a channel used to broadcast location information;
wherein the control information comprises an identification part for specifying the device;
wherein the device lacks a registration with the network; and
wherein the device lacks a Radio Resource Control connection with the network.

2. The method according to claim 1, wherein the control channel is a System Information Block (SIB) channel.

3. The method according to claim 2, wherein the control channel is a System Information Block (SIB) type 2 channel.

4. The method according to claim 1, wherein the control information comprises a command part for defining remote controlled behavior of the device.

5. The method according to claim 1, wherein the identification part of the control information specifies one device or a plurality of devices.

6. The method according to claim 1, wherein the control information comprises one or more UMTS Registration Area (URA) identities.

7. The method according to claim 6, wherein the one or more URA identities are part of a set of reserved URA identities.

8. A device for being remotely controlled by a fixed transceiver station in a radio cell of a cellular mobile telecommunications network, wherein the cellular mobile telecommunications network is at least one of a Long Term Evolution (LTE) network or a Universal Mobile Telecommunications System (UMTS) Terrestrial Radio Access Network (UTRAN), the device comprising:

a receiver configured to receive control information specific to the radio cell transmitted by the fixed transceiver station on a control channel; and a controller configured to decode the control information;

wherein the control channel is a channel or a portion of a channel used to broadcast location information;

wherein the control information comprises an identification part for specifying the device;

wherein the device lacks a registration with the network; and wherein the device lacks a Radio Resource Control connection with the network.

9. The device according to claim 8, wherein the control channel is a System Information Block (SIB) type 2 channel.

10. The device according to claim 8, wherein the control information comprises one or more UMTS Registration Area (URA) identities.

11. The device according to claim 8, wherein the control information comprises a command part for defining remote controlled behavior of the device.

12. The device according to claim 8, wherein the identification part of the control information specifies one device or a plurality of devices.

13. A non-transitory computer-readable medium having processor-executable instructions for remotely controlling a device by a fixed transceiver station in a radio cell of a cellular mobile telecommunications network stored thereon, wherein the cellular mobile telecommunications network is at least one of a Long Term Evolution (LTE) network or a Universal Mobile Telecommunications System (UMTS) Terrestrial Radio Access Network (UTRAN), the processor-executable instructions, when executed, causing the following to be performed:

transmitting to the device on a control channel, by the fixed transceiver station, control information specific to the radio cell;

wherein the control channel is a channel or a portion of a channel used to broadcast location information;

wherein the control information comprises an identification part for specifying the device;

wherein the device lacks a registration with the network; and wherein the device lacks a Radio Resource Control connection with the network.

* * * * *